United States Patent
Beier

(10) Patent No.: US 12,362,962 B2
(45) Date of Patent: Jul. 15, 2025

(54) TRANSMISSION METHOD THROUGH IN-VEHICLE SWITCH-BASED NETWORK

(71) Applicant: Aptiv Technologies AG, Schaffhausen (CH)

(72) Inventor: Ralf Anton Beier, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 393 days.

(21) Appl. No.: 17/815,140

(22) Filed: Jul. 26, 2022

(65) Prior Publication Data

US 2023/0033771 A1 Feb. 2, 2023

(30) Foreign Application Priority Data

Jul. 27, 2021 (EP) ..................................... 21188015

(51) Int. Cl.
*H04L 12/40* (2006.01)
*G07C 5/08* (2006.01)

(52) U.S. Cl.
CPC ...... *H04L 12/40006* (2013.01); *G07C 5/0808* (2013.01); *G07C 5/0816* (2013.01); *H04L 2012/40273* (2013.01)

(58) Field of Classification Search
CPC ..... H04L 12/40006; H04L 2012/40273; H04L 67/125; H04L 67/34; H04L 47/245; H04L 47/72; H04L 49/351; H04L 47/2433; G07C 5/0808; G07C 5/0816
See application file for complete search history.

(56) References Cited

U.S. PATENT DOCUMENTS 6,629,032 B2 9/2003 Akiyama
10,103,938 B1 * 10/2018 Samii .................... H04L 49/351
2009/0028186 A1 1/2009 Schmidt et al.

FOREIGN PATENT DOCUMENTS

| CN | 102932224 | 2/2013 | |
|----|-----------|--------|---|
| WO | WO-2017015462 A1 * | 1/2017 | .............. G06F 11/30 |
| WO | WO-2018137838 A1 * | 8/2018 | ........... B60R 16/023 |
| WO | WO-2019157601 A1 * | 8/2019 | ......... H04B 7/18506 |
| WO | 2020207429 | 10/2020 | |

OTHER PUBLICATIONS

"Extended European Search Report", EP Application No. 21188015. 8, Jan. 26, 2022, 11 pages.
Hackel, et al., "Strategies for Integrating Control Flows in Software-Defined In-Vehicle Networks and Their Impact on Network Security", Dec. 16, 2020, 8 pages.
Houtan, et al., "Work in Progress: Investigating the Effects of High Priority Traffic on the Best Effort Trafic in TSN Networks", Dec. 3, 2019, pp. 556-559.

* cited by examiner

*Primary Examiner* — Joseph J Dallo
(74) *Attorney, Agent, or Firm* — Harness, Dickey & Pierce, P.L.C.

(57) ABSTRACT

Methods and apparatuses for transmitting data through a switch-based network in an in-vehicle communications network system. In an example transmission-based method, the method includes for a transmitter device generating, by a generator, a reservoir data stream (RSSj). The method also includes transmitting the reservoir data stream (RSSj) through the switch-based network. The method further includes, when a new data stream from the transmitter device to a receiver device is needed, replacing, by an injector, at least part of the reservoir data stream (RSSj) by a new data stream.

16 Claims, 3 Drawing Sheets

TRANSMISSION METHOD THROUGH IN-VEHICLE SWITCH-BASED NETWORK

INCORPORATION BY REFERENCE

This application claims priority to European Patent Application Number EP21188015.8, filed Jul. 27, 2021, the disclosure of which is incorporated by reference in its entirety.

BACKGROUND

In the automotive field, the current in-vehicle communications network architectures include separated functional system domains such as body/comfort, chassis, power train, and infotainment. The architecture is based on functions of the systems and not on location of the systems in the vehicle. Each domain is developed with a different schedule and different requirements. The communication between domains is limited. The automotive manufacturers can qualify that one domain is working by performing some testing to ensure that functionalities are working properly, independently from another domain.

To overcome some issues of the architecture based on separated domains, such as physical wiring requirements, a zone-based or zonal architecture has been proposed. It allows to reduce the physical wiring requirements within the vehicle.

In a transition to the zonal architecture, some domains need to share resources such as communication buses.

Furthermore, the development of over-the-air updates enables the automotive manufacturers to continue developing the vehicles after their production and first rollout (in other words: first use) with frequent updates or releases of software components within the vehicles. Some domains, for example infotainment, advanced driver assistance system (ADAS), and/or autonomous driving (AD), are likely to get more frequent updates than other domains like body/comfort or powertrain.

A problem arises when a change in one domain requires a qualification (in other words: some testing) for all domains, because the different domains share resources. Such a qualification for all domains may increase the price for each software update and increase the time for deploying the updated architecture by the time needed for testing.

Therefore, there is a need for facilitating a qualification (testing) of the in-vehicle communications network system when a change is made on the vehicle system, for example when a software update is performed.

SUMMARY

The present disclosure relates, for example, to the field of data transmission through a switch-based Ethernet network in an in-vehicle communications network system.

The present disclosure concerns, for instance, a method for transmitting data through a switch-based network in an in-vehicle communications network system, including the following steps performed at a transmitter device: generating, by a generator, a reservoir data stream and transmitting said reservoir data stream through the switch-based network; and responsive to a new data stream from the transmitter device to the receiver device being needed, replacing, by an injector, at least part of the reservoir data stream with the new data stream.

The addition of a reservoir data stream, for example at a production or development stage (time) of the switch-based network, before it is used for the first time in the vehicle, allows to facilitate a later qualification (testing) of the network when a change on the network is performed. It is not necessary to change the amount or timing of the communications within the switch-based network when the change is implemented. Only in a case for which the in-vehicle network needs to change importantly, an adjustment of the network needs to be made.

In an embodiment, if a data traffic that is transmitted from the transmitter device to the receiver device includes a regular data stream, the reservoir data stream is added to said regular data stream.

In an embodiment, the generator generates data of at least one type selected from a group of data types including random data, data for analytics, data for computer security, data for diagnostics, and data for logging to create the reservoir data stream. Random data can be generated to create the reservoir data stream. However, any other type of data could be used.

In an embodiment, the method further includes a step of configuring (setting) the generator to generate said reservoir data stream, before a first use of said switch-based network, and wherein the replacing at least part of the reservoir data stream by the new data stream is performed during lifetime (operation) of the switch-based network. The reservoir data stream can be advantageously set up before a first rollout of the switch-based network.

In an embodiment, the replacing at least part of the reservoir data stream by the new data stream is performed when a software update requiring the addition of said new data stream from the transmitter device to the receiver device is performed within the switch-based network. A software update within the in-vehicle system is typically a situation that may require the addition of a new data stream between two devices.

In an embodiment, the generator generates a plurality of additional reservoir data streams having different transmission rates for the same receiver device. In that case, the injector selects, among said plurality of additional reservoir data streams having different transmission rates, one reservoir data stream having a transmission rate that includes a transmission rate of the new data stream.

Determining which reservoir streams to add within the in-vehicle switch-based network can be based on assumptions related to future changes and made during the initial development of the network.

In an embodiment, the generator generates a plurality of additional reservoir data streams that are for different receiver devices.

In an embodiment, with a plurality of reservoir data streams being transmitted through the switch-based network, the method further includes a step of selecting, from among said plurality of reservoir data streams, a reservoir data stream that fulfills requirements of the new data stream, said requirements including a transmitter device, a receiver device, and a transmission rate.

The present disclosure also concerns, for instance, a transmitter device for an in-vehicle communications network system, including means for carrying out the steps of the method previously defined.

The present disclosure also concerns, for instance, a method for receiving data by a receiver device through a switch-based network in an in-vehicle communications network system, the method including the following steps performed by the receiver device: receiving, from a transmitter device through the switch-based network, a reservoir data stream; and when a new data stream from the transmitter device to the receiver device is required, extracting, by an extractor, the new data stream from the reservoir data stream.

In an embodiment, the data of the received reservoir data stream is either discarded or used for at least one function selected from a group of functions including an analytics function, a diagnostic function, a computer security function, and a logging function to be implemented by the receiver device.

The present disclosure also concerns, for instance, a receiver device for an in-vehicle communications network system, including means for carrying out the steps of the method that is defined above for a receiver device.

The present disclosure also concerns, for instance, an in-vehicle communications network system including one or more transmitter devices as previously defined, one or more receiver devices as above defined, transmission lines for transmitting data streams, and one or more switches for routing the data streams.

The present disclosure also concerns, for instance, a vehicle including the communications network system as above defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
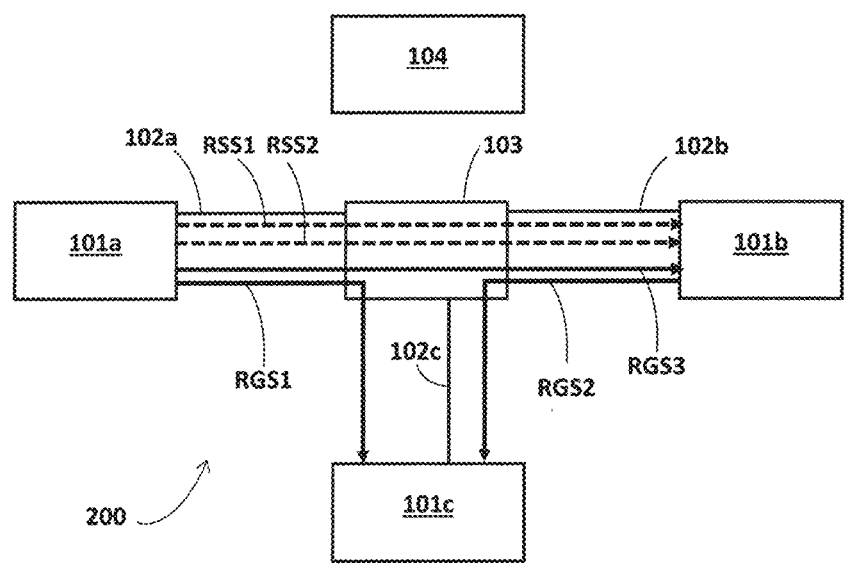
FIG. 1 shows an illustrative example of a part of an in-vehicle communications network system, according to an embodiment.

FIG. 1 illustrates different devices $101a, 101b, 101c, \ldots$ that are interconnected to form an example in-vehicle communications network system within a vehicle. The devices $101a, 101b, \ldots$ can communicate with each other through a switch-based network 200, for example a switch-based Ethernet network, that includes one or more transmission lines $102a, 102b, 102c, \ldots$ and one or more switches 103. In the switch-based network 200, routing is performed by using routing tables embedded in switches 103. Each switch 103 has a function of routing data in the network based on its routing table.

In the example shown in FIG. 1, the in-vehicle communications network system includes three devices $101a, 101b, 101c$, and each device is connected to the two other devices through the switch 103. The example given in FIG. 1 is only illustrative. There are various embodiments of the in-vehicle communications network system.

In a first rollout, before a first use of the in-vehicle communications network system, first regular communications between the different devices $101a, 101b, 101c$ are set up (in other words: configured). A regular communication is a normal communication from a transmitter device to a receiver device to transmit useful data for the receiver device (in other words: data that will be used, processed by the receiver device). In operation, the data transmitted through the regular communications is processed by the receiver device after reception, for example to execute an action within the system. In an embodiment, the regular communications carry data that are necessary for the in-vehicle system to work.

In an embodiment, before the first use of the in-vehicle communications network system, additional communications are configured (in other words: set up), in addition to the regular communications. The additional communications exist in parallel with the regular communications. Each additional communication between a transmitter device and a receiver device includes one or more reservoir data streams. It is generated by a generator of the transmitter device and transmitted from the transmitter device to the receiver device (or to a plurality of receiver devices) through the switch-based network 200. The reservoir data streams only carry data that is not essential for the switch-based network 200 (and/or the in-vehicle communications network system) to work and could be deleted without changing or affecting the operation of the switch-based network 200 (and/or in-vehicle system).

In an embodiment, the data carried by a reservoir data stream includes random data generated by a random or pseudo-random generator. In other embodiments, the data carried by a reservoir data stream can include other types of data related to optional functions to be implemented by the receiver device. For example, the data of the reservoir data stream can include data for analytics, data for computer security (e.g., data related to a honeypot), data for logging, and/or data for analytics, etc. Other types of optional data could be considered for the reservoir data streams. In any way, the data carried by the reservoir data stream is additional and optional data that can be deleted (and/or replaced) at some point during the lifetime of the switch-based network 200, without changing or affecting the operation of the switch-based network 200. A function of the reservoir data stream is to provide a flow of (available) data between the transmitter device and the receiver device, from the first rollout (first use) of the switch-based network 200 and during its lifetime (operational lifetime).

Typically, when the in-vehicle communications network system is deployed, at its first rollout (before a first use), it is submitted to testing or qualification to ensure that the system is working properly. During qualification (testing), functionalities of the system are tested to check if they work. When the in-vehicle communications network system is qualified, the reservoir data streams exist and are taken into account in the qualification. A qualification could also be performed after the first rollout at any moment during the lifetime of the vehicle system.

When a change of the in-vehicle communications network system is needed, for example after it has been initially deployed, due to a software update or a new release within the switch-based network 200, it may require the addition of a new data stream from a transmitter device to a receiver device to carry data for the receiver device. The new data stream may have some requirements including a source (transmitter) device, destination (receiver) device, and a transmission rate. In that case, an existing reservoir data stream that fulfills the requirements of the new data stream is searched and selected among the plurality of reservoir data streams. Then, at the source (transmitter) device, an injector replaces at least part of the selected reservoir data stream by the new data stream. In other words, at least part of the data initially carried by the reservoir data stream is replaced by the data of the required new data stream.

Figure 2:
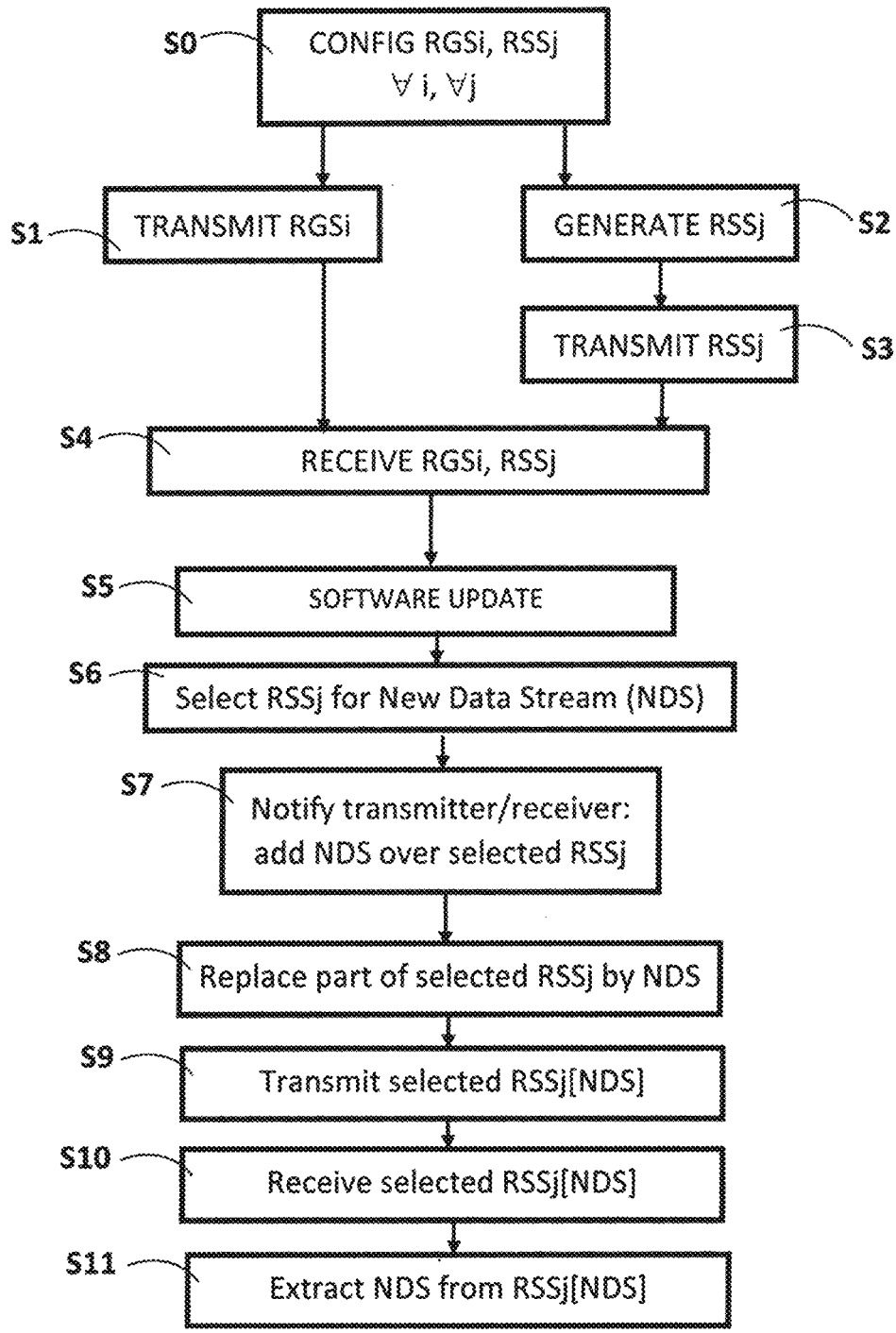
FIG. 2 is a flowchart of an example method for transmitting data and an example method for receiving data, according to an embodiment.

FIG. 2 illustrates an example method of transmitting data and a corresponding example method of receiving data through the switch-based network 200, according to an embodiment, that will now be described.

In a configuration (setting) phase S0, for example before a client deployment of the in-vehicle system and/or before first rollout of the switch-based network 200, a plurality of communications is set up within the switch-based network 200.

The communications that are initially set up within the switch-based network 200 include regular communications RGSi (regular data streams) and reservoir communications RSSj (reservoir data streams), i and j being indexes. After configuration, the switch-based network 200 can route the configured regular communications RGSi and the configured reservoir communications RSSj. In operation, when the in-vehicle system is running, the regular data streams RGSi are transmitted within the switch-based network 200 (step S1).

In addition, for each reservoir data stream RSSj that has been set up from a transmitter (source) device to a receiver (destination) device, a generator of the transmitter device generates the reservoir data stream RSSj in a step S2 and transmits it to the receiver device through the switch-based network 200 in a step S3. The generator can include a random data generator that generates random data to create the reservoir data stream. Alternatively, it can generate other types of data (analytics, diagnostic, security, and/or logging, etc.) that is optional for the switch-based network 200 to work and can be replaced.

In a step S4, the receiver devices receive the regular data streams RGSi and the reservoir data streams RSSj. Each regular data stream received by a receiver device is processed (used) by the receiver device. The random data of the reservoir data streams RSSj is discarded or ignored by the receiver devices. Alternatively, in case that the data of the reservoir data stream RSSj includes other types of data (analytics data, diagnostic data, security data, and/or logging data, etc.), the receiver device utilizes the data carried by the reservoir data stream RSSj for corresponding purposes (analytics, diagnostic, computer security (e.g., honeypot for hackers), data logging, etc.).

In the example of FIG. 1, the following first regular communications RGSi are set up (established) within the network 200:
- a regular communication from the device 101a to the device 101c including a data stream RGS1 containing one data burst (e.g., 400 kb) every 10 milliseconds (ms);
- a regular communication from the device 101b to the device 101c including a constant data stream RGS2 of 1 megabyte per second (MB/s);
- a regular communication of high priority from the device 101a to the device 101b including a data stream RGS3 of 100 bytes every 10 ms.

Furthermore, two reservoir data streams RSSj are added into the system:
- a reservoir data stream RSS1 from the transmitter device 101a to the receiver device 101b including one burst of data every 5 ms;
- a reservoir data stream RSS2 from the transmitter device 101a to the receiver device 101b including a constant data stream of 500 kilobytes per second (kb/s).

When the in-vehicle communications network system is running, the regular data streams RGS1, RGS2, RGS3 and the reservoir data streams RSS1 and RSS2 are routed by the pre-configured switch 103 and transmitted through the switch-based network 200.

Then, during the lifetime of the in-vehicle communications network system, a change on the system may be necessary and require the addition of a new data stream NDS within the switch-based network 200. The change on the system can result from a software update (or from the implementation of a new software release) in the switch-based network 200. The step S5 in FIG. 2 represents the software update.

The new data stream NDS has some requirements or characteristics. In an embodiment, the requirements of the new data stream NDS include a source (transmitter) device, a destination (receiver) device, and a transmission rate.

In a step S6, an element of the in-vehicle communications network system, for example a supervising control device 104, searches and selects, among the plurality of a reservoir data streams RSSj existing within the switch-based network 200, one reservoir data stream that can fulfill the requirements of the new data stream. The supervising control device 104 can have a table or database storing information on all communications (e.g., all data streams) established in the system. For example, an adequate reservoir data stream is searched for in the database storing information on all the reservoir data streams set up in the network 200. Alternatively, the search and selection could be performed by one or more devices 101a, 101b, . . . of the network 200. The selected reservoir data stream has the required transmitter and receiver devices, and the transmission rate of the reservoir data stream can include the transmission rate of the new data stream.

For example, due to the software update S5, it is needed to add in the switch-based network 200 a new data stream of useful data, including one data burst every 100 ms, from the transmitter device 101a to the receiver device 101b. In that case, the reservoir data stream RSS1 from the transmitter device 101a to the receiver device 101b including one burst every 5 ms is selected, and part of the reservoir data stream RSS1 is replaced with the new data stream (which has 1 burst every 100 ms).

Then, in a step S7, the transmitter device and the receiver device linked by the selected reservoir data stream, which are devices 101a and 101b that are linked by RSS1 in the example given above, are notified to add the new data stream NDS over the selected reservoir data stream RSSj. The transmission rate of the new data stream NDS is provided to them.

In a step S8, since the addition of the new data stream NDS from the transmitter device 101a to the receiver device 101b is required to carry useful data for the receiver device 101b, an injector of the transmission device 101a replaces at least part of the selected reservoir data stream RSS1 by the data of the new data stream NDS. In this way, the new data stream NDS is transmitted over the reservoir data stream RSS1 from the transmitter device 101a to the receiver device 101b.

In a step S9, the selected data stream RSS1 including the new data stream NDS is transmitted from the transmitter device 101a to the receiver device 101b, here via the switch 103, without requiring any adjustment within the network 200.

In a step S10, the receiver device 101b receives the transmitted reservoir data stream RSS1 including the new data stream NDS, together with the regular data stream(s) (RGS3 in FIG. 1). An extractor of the receiver device 101b extracts the new data stream NDS from the received reservoir data stream RSS1, in a step S11. The remaining data of the reservoir data stream RSS1 (random data) is ignored or discarded. Alternatively, in case that the reservoir data stream includes remaining data for other optional purposes (analytics, diagnostic, security, logging, etc.), the remaining data is used for the corresponding purposes by the receiver device.

The present disclosure allows the switch-based network 200 to be updated during its lifetime after a first rollout, without need to make adjustment of the network 200. The switches of the network do not need to be reconfigured.

Figure 3:
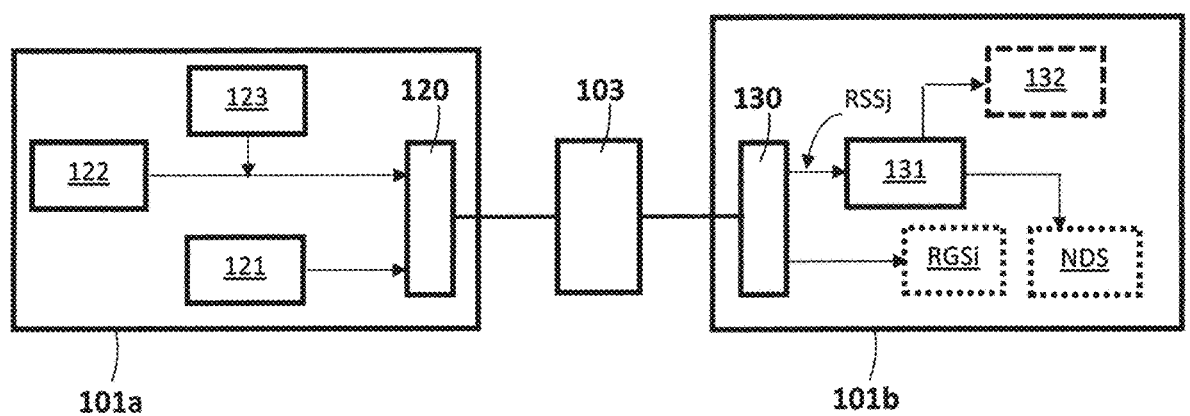
FIG. 3 is a functional block diagram of an example transmitter device and an example receiver device, according to an embodiment.

An embodiment of the transmitter device, for example the transmitter device 101a, is illustrated in FIG. 3 and will now be described. For the sake of conciseness, only the elements of the device related to the present disclosure will be described.

The transmitter device 101a includes means for carrying out the steps of the method for transmitting data previously described. According to an embodiment, the transmitter device 101a includes a network interface 120 to interface with the switch-based network 200, one or more sources 121 of regular data streams, a reservoir data stream generator 122, an injector 123, and a processing unit or processor (not represented) controlling the operation of the device 101a.

The generator 122 is responsible for generating one or more reservoir data streams and transmitting said one or more reservoir data streams through the switch-based network 200. In an embodiment, it includes a random data generator that generates random data to create the reservoir data stream(s). In other embodiments, the generator 122 generates data for other (optional) purposes, such as analytics, diagnostic, security, logging, etc., that could be ignored (deleted or replaced) later during the lifetime of the network 200. The generator 122 may generate a plurality of additional reservoir data streams having different transmission rates for the same receiver device. It may also generate a plurality of additional reservoir data streams that are for different receiver devices.

The injector 123 is responsible for replacing at least part of a reservoir data stream from the transmitter device 101a to a given receiver device by a new data stream of useful data for the receiver device. Furthermore, when the generator 122 generates several reservoir data streams having different transmission rates to the same receiver device, the injector is responsible for selecting, among said reservoir data streams having different transmission rates, one reservoir data stream which transmission rate can include a transmission rate of the new data stream.

The transmitter device 101a has hardware and software to implement its functionalities. In an embodiment, the generator 122 and the injector 123 are software components running on the processing unit.

An embodiment of the receiver device, for example the receiver device 101b, is illustrated in FIG. 3 and will now be described. For the sake of conciseness, only the elements of the device related to the present disclosure will be described.

The receiver device 101b includes means for carrying out the steps of the method for receiving data previously described. In an embodiment, the receiver device 101b includes a network interface 130 to interface with the switch-based network 200, an extractor 131, and a processing unit or processor (not represented) to control the operation of the receiver device 101b.

A traffic data including one or more regular data stream(s) RGSi, and possibly one or more reservoir data stream(s) RSSj, is received by the receiver device 101b through the network interface 130. In the example of FIG. 1, the regular stream RGS3 and the two reservoir streams RSS1 and RSS2 are received through the interface 130. The extractor 131 is responsible for extracting the reservoir data stream(s) (e.g., RSS1 and RSS2 in FIG. 1) from the data traffic received by the network interface 130. In addition, when a new data stream has been added over a received reservoir data stream, the extractor 131 is responsible for extracting the new data stream and forwarding it within the receiver device for further processing. The (other) data of the received reservoir data stream(s) RSSj is ignored or discarded (not further processed or used) by the extractor 131. Alternatively, the data could be transmitted to a processor for implementing a specific (optional) functionality (analytics, diagnostic, security, logging, etc.), as previously explained.

The receiver device 101b transmits the received regular data stream(s) RGSi and the extracted new data stream NDS to the processing unit for further processing or use.

Optionally, the receiver device 101b has an analyzer 132 for analyzing the received reservoir data stream(s), in particular in testing (qualification).

What is claimed is:

1. A method for transmitting test data, the method comprising:
    determining test data to be transmitted from a transmitter to a receiver through a switch-based network, the test data having one or more transmission requirements, wherein the transmitter comprises a generator for generating a plurality of predetermined data streams;
    selecting one of the plurality of predetermined data streams that fulfills the transmission requirements of the test data;
    replacing at least part of the selected data stream with the test data to form a test data stream; and
    transmitting the test data stream to the receiver for testing functionality of the switch-based network.

2. The method according to claim 1, further comprising:
    transmitting, from the transmitter device to the receiver device, data traffic including a data stream for an action to be executed by the receiver device, and one of the plurality of predetermined data streams.

3. The method according to claim 1, further comprising:
    generating, to create each of the plurality of predetermined data streams, at least one of random data, data for analytics, data for computer security, data for diagnostics, or data for logging.

4. The method according to claim 1, wherein:
    the replacing at least part of the selected data stream with the test data is performed responsive to performance within the switch-based network of a software update requiring an addition of the test data from the transmitter device to the receiver device.

5. The method according to claim 1, wherein the plurality of predetermined data streams have different transmission rates for a same receiver device.

6. The method according to claim 5, further comprising:
    selecting, from among the plurality of predetermined data streams having different transmission rates, the predetermined data stream having a transmission rate that can include a transmission rate of the test data.

7. The method according to claim 1, further comprising:
    generating a plurality of additional predetermined data streams that are for different receiver devices.

8. The method according to claim 1, wherein
    the requirements of the plurality of predetermined data streams include the transmitter device, the receiver device, and a transmission rate.

9. An apparatus comprising:
    a transmitter device configured to:
        determine test data to be transmitted from a transmitter to a receiver through a switch-based network, the test data having one or more transmission requirements, wherein the transmitter comprises a generator for generating a plurality of predetermined data streams;

select one of the plurality of predetermined data streams that fulfills the transmission requirements of the test data;

replace at least part of the selected data stream with the test data to form a test data stream; and transmit the test data stream to the receiver for testing functionality of the switch-based network.

10. The apparatus according to claim 9, wherein the transmitter device is further configured to:

transmit a data stream for an action to be executed by the receiver device, from the transmitter device to the receiver device; and transmit one of the plurality of predetermined data streams from the transmitter device to the receiver device.

11. The apparatus according to claim 10, wherein the transmitter device is further configured to:

replace at least part of the selected data stream with the new data stream responsive to performance within the switch-based network of a software update requiring an addition of the test data from the transmitter device to the receiver device.

12. The apparatus according to claim 9, wherein the requirements of the plurality of predetermined data streams include the transmitter device, the receiver device, and a transmission rate.

13. The apparatus according to claim 9, further comprising:

the receiver device configured to:

receive the test data stream; and extract the test data from the received test data stream.

14. The apparatus according to claim 13, wherein the receiver device is further configured to at least one of:

discard data of the received test data stream; or use the data of the received test data stream for at least one of an analytics function, a diagnostic function, a computer security function, or a logging function.

15. The apparatus according to claim 13, further comprising:

an in-vehicle communications network system including:

the transmitter device;

the receiver device;

a plurality of transmission lines configured to transmit data streams; and one or more switches configured to route the data streams.

16. The apparatus according to claim 15, wherein the apparatus comprises a vehicle.

* * * * *